United States Patent [19]
Beisch et al.

[11] 4,131,322
[45] Dec. 26, 1978

[54] WHEEL TRIM RETENTION

[75] Inventors: Hans R. Beisch, Amherstburg, Canada; Heinrich J. Hempelmann, Warren, Mich.

[73] Assignee: Norris Industries, Inc., Ypsilanti, Mich.

[21] Appl. No.: 724,926

[22] Filed: Sep. 20, 1976

[51] Int. Cl.² .............................................. B60B 7/06
[52] U.S. Cl. .............................. 301/37 PB; 301/37 R; 220/324; 24/214; 403/380
[58] Field of Search ............. 301/37 R, 37 AT, 37 C, 301/37 CD, 37 TP, 37 PB, 37 B, 37 H, 108 R, 108 A; 220/307, 324, 319; 24/213 R, 214; 285/317; 403/204, 380, 361; 292/19

[56] References Cited
U.S. PATENT DOCUMENTS

| 2,102,471 | 12/1937 | Lyon | 301/37 PB |
| 2,584,142 | 2/1952 | Lyon | 301/37 B |
| 2,607,632 | 8/1952 | Lyon | 301/37 PB |
| 2,698,203 | 12/1954 | Landell | 301/37 R |
| 2,732,262 | 1/1956 | Buerger | 301/37 R |
| 2,733,104 | 1/1956 | Lyon | 301/37 PB |
| 3,168,349 | 2/1965 | Maletzke | 301/37 R |
| 3,199,921 | 8/1965 | Boroday et al. | 301/37 R |

Primary Examiner—Robert B. Reeves
Assistant Examiner—H. Grant Skaggs
Attorney, Agent, or Firm—Harness, Dickey & Pierce

[57] ABSTRACT

There is disclosed herein a wheel trim retention for securely and removably attaching a wheel trim member to a vehicle wheel comprising a retention band having a plurality of clip members secured to the wheel facing side thereof each of which has a pair of tooth carrying arms which are adapted to bitingly engage a portion of the wheel so as to form a primary retention arrangement. The retention band may also be provided with an annular or localized radially outwardly extending protrusion which is adapted to engage a safety groove provided on the wheel in response to the distortion of the retention band caused by the forces generated by the engagement of the toothed members with another portion of the wheel thereby providing a secondary mechanically interlocking retention.

43 Claims, 12 Drawing Figures

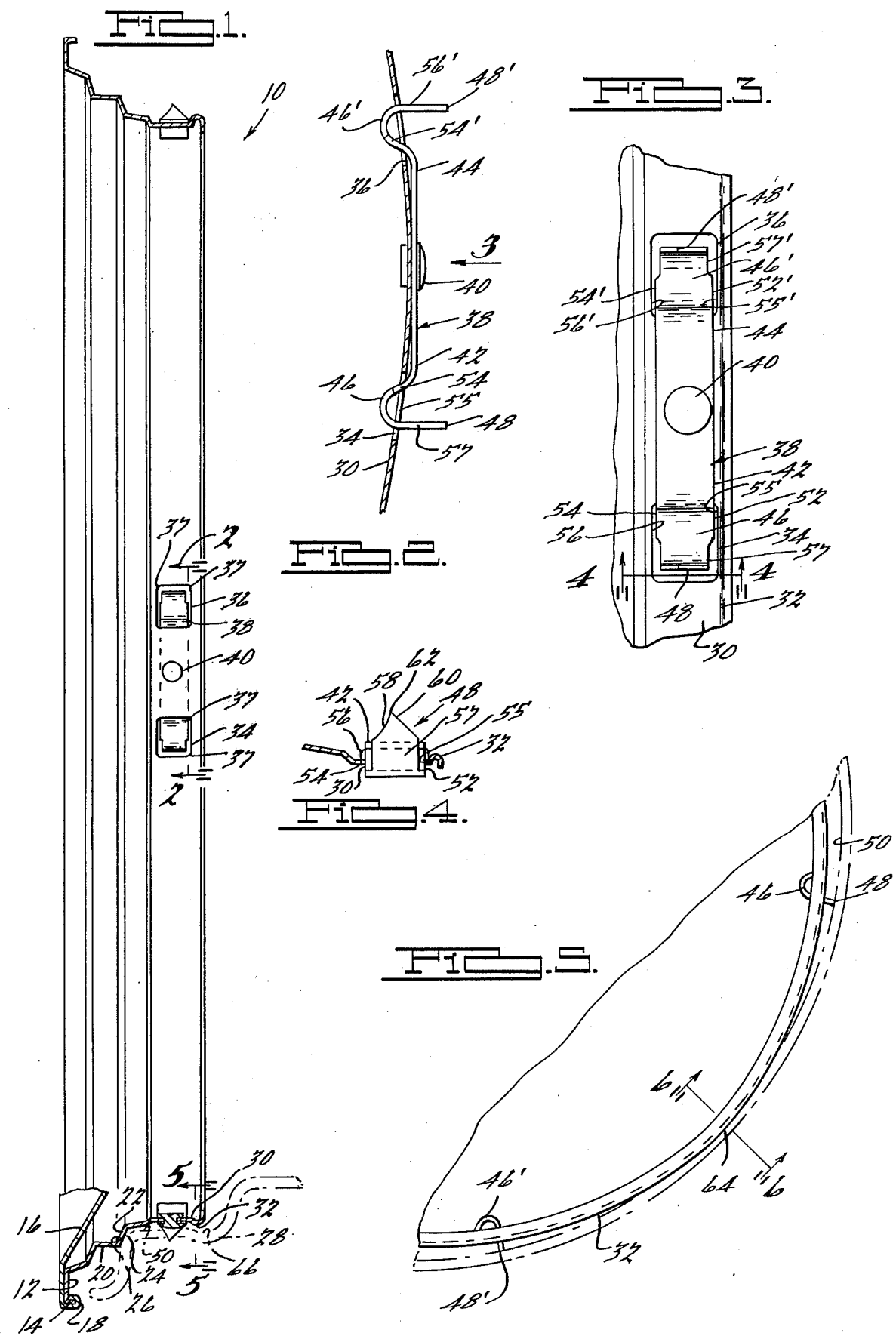

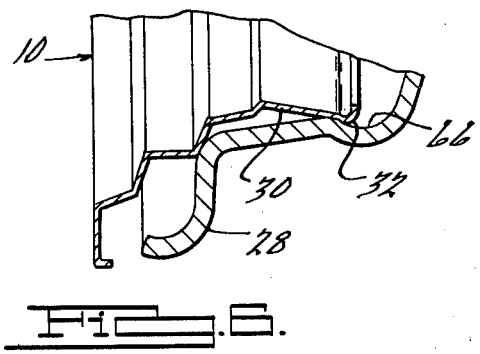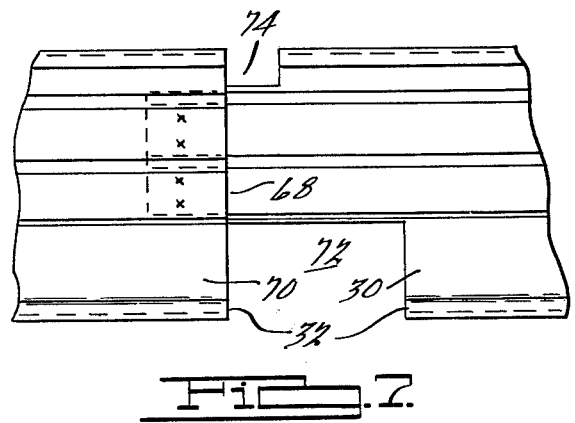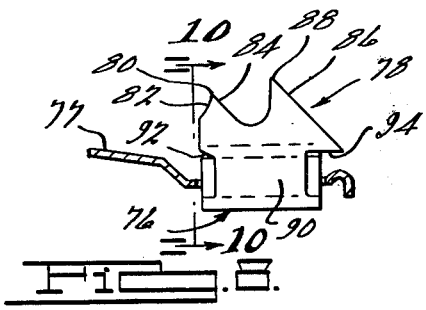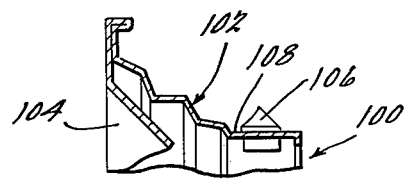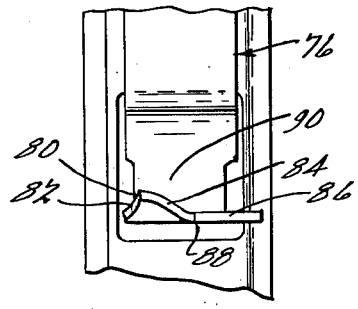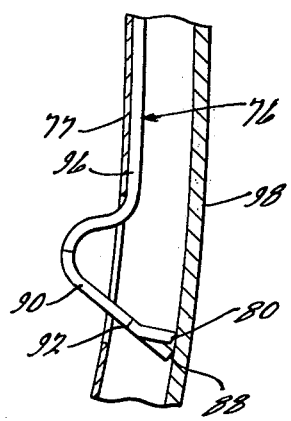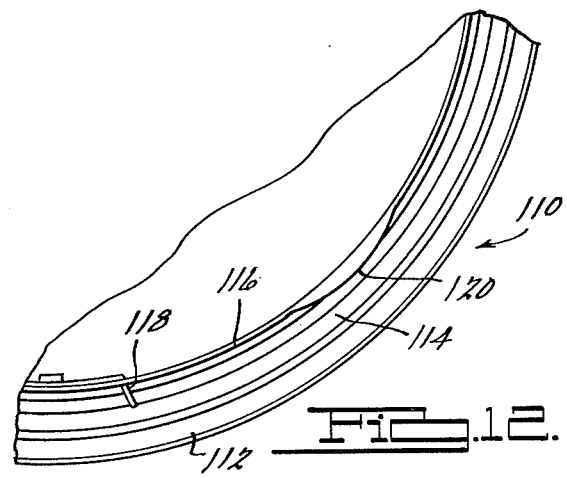

WHEEL TRIM RETENTION

BACKGROUND AND SUMMARY OF THE INVENTION

The present invention relates generally to wheel trim retention means and more particularly to such retention means employing a band having a plurality of primary retention means secured to the outer surface thereof which are adapted to bitingly engage a portion of the wheel and which may include a remotely located secondary retention means provided on the band which is designed to be actuated by a primary retention means.

Wheel covers and trim rings have long been in use on motor vehicles both to protect and to decorate the wheel. One of the major problems associated with the manufacture and use of these wheel trims has been to design reliable and inexpensive retention means to removably secure the trim to the wheel. In use, wheels are subject to a great variety of vibrations and other forces which the retention means must be capable of withstanding and yet the retention means must still allow the trim to be easily removed such as for tire changes or the like. Compounding this problem is the desire to keep the cost of these trim members and their associated retaining means as low as possible, to minimize interference with the aesthetic design of the trim, and to prevent annoying rattle and relative rotation between the trim member and the wheel.

One method which is used to retain various types of trim members to vehicle wheels employs a biting type clip member secured to the rim facing side of a retention band by a pair of rivets and a trim member having a portion crimped over this retention band. Indentations are provided on the retention band to enable the tooth carrying arms of the clip member to move radially inward as the wheel trim is placed on the wheel rim. This arrangement is relatively costly to manufacture in that each clip member requires two rivets to secure it and the retention band must be locally deformed to provide the indentations for accommodating the movement of the tooth carrying arms. Further, the retention force exerted between the toothed members and the wheel will be transmitted to the retention band and cause localized radially inward deformation thereof in the area of engagement between the clip members and retention band. This deformation results in a lessening of the retention force that the teeth are able to exert upon the wheel.

Another technique to retain wheel trim involves the use of clip members secured to the radially inner side of a retention band and having toothed projections extending radially outward through apertures provided in the retention band so as to engage a portion of the wheel. This arrangement allows the use of a single rivet to secure the clip members to the retention band as the toothed members projecting through the apertures will cooperate therewith to prevent rotation of the clip member with respect to the retention band. However, as only a single rivet is used, it must be of substantial strength as must the retention band for all the retention forces are transmitted directly from the clip member through the rivet to the retention band. Accordingly, substantially heavier gauge material must be used in manufacturing the retention band so as to prevent the rivet from pulling out.

Accordingly, the present invention provides a retention band having means suitable for securely and removably retaining various types of trim members, such as wheel covers or trim rings, to a vehicle wheel which overcomes these disadvantages. The retention band of the present invention has a primary retention means comprising a plurality of biting members each secured by a single rivet at spaced apart locations around the periphery thereof which engage a portion of the vehicle wheel. Additionally, a remotely located secondary retention means may be provided which is actuated by primary retention means and engages another portion of the vehicle wheel to form a mechanical interlock thereby insuring the trim member will not be dislodged by vibrations or other forces exerted thereon. Further, thinner gauge material may be used in fabricating the retention band as the clip member is secured to the radially outer surface thereof thus distributing the retention forces over a broader surface area. Rotation or twisting of the clip member relative to the retention band is also effectively precluded by providing a relatively close fit between a portion of the tooth carrying arms of the clip member and apertures in the retention band. These features allow the present invention to be manufactured at a relatively low unit cost while still providing a safe, positive, and reliable retention means which is suitable for use with trim members of most any design.

Other features and advantages of the present invention will become apparent from the following description of the preferred embodiment taken in conjunction with the claims and appended drawings.

BRIEF DESCRIPTION OF THE DRAWINGS

FIG. 1 is a sectional view of a retention band in accordance with the present invention having a trim member secured thereto, the section being taken on a radial plane passing through the rotational axis of the wheel;

FIG. 2 is a sectional view of a portion of the retention band of FIG. 1 taken along line 2—2 thereof;

FIG. 3 is another view of the portion of the retention band shown in FIG. 2 as viewed in the direction indicated by arrow 3;

FIG. 4 is an enlarged sectional view of the retention band of the present invention illustrating the tooth portion of the retaining clip, the section being taken along lines 4—4 of FIG. 3;

FIG. 5 is a sectional view of a portion of the retention band of FIG. 1 shown in an installed relationship to a portion of a wheel, the section being taken along line 5—5 of FIG. 1;

FIG. 6 is a radially sectioned view of the retention band in accordance with the present invention shown in relation to a portion of the wheel, the section being taken along line 6—6 of FIG. 5;

FIG. 7 is a view of circumferential portion of the retention band of the present invention illustrating a means for securing the band in a circular configuration and the opening for a tire valve stem;

FIG. 8 is a sectional view of a portion of a retention band in accordance with the present invention similar to that of FIG. 4 but illustrating an alternate tooth construction;

FIG. 9 is a view similar to that of FIG. 3 but illustrating the embodiment of FIG. 8;

FIG. 10 is a sectional view taken along line 10—10 of FIG. 8 showing the embodiment thereof in relationship to a portion of a vehicle wheel;

FIG. 11 is a sectional view similar to that of FIG. 1 but showing a portion of another embodiment of the present invention; and FIG. 12 is a sectional view of a portion of another embodiment of the present invention, the section being taken along a radial plane perpendicular to the axis of rotation.

DESCRIPTION OF THE PREFERRED EMBODIMENTS

Referring now to FIG. 1, there is shown a retention band in accordance with the present invention indicated generally at 10 adapted for use in securely retaining a wheel trim to a generally flanged vehicle wheel. Retention band 10 is generally conical in shape and has a radially outwardly extending flange portion 12 at its axially outer edge which includes a relatively short axially inwardly extending annular tab portion 14. Flange portion 12 and tab portion 14 are adapted to allow a wheel trim member 16, which may be either a wheel cover or a trim ring, to be secured thereto such as by crimping or otherwise forming a circumferential edge portion 18 of wheel trim member 16 thereover. Retention band 10 has an irregular axial cross-sectional contour extending generally radially and axially inward from flange portion 12 including a generally axially inwardly extending flange portion 20 and an adjoining generally radially and axially inwardly extending flange portion 22 which cooperate to form an annular shoulder portion 24 adapted to engage a shoulder portion 26 provided on wheel 28 so as to position retention band 10 and associated wheel trim 16 with respect to wheel 28 and insure a sufficient clearance between flange portion 12 and wheel 28 to allow for installation of balancing wheel weights as well as to allow for insertion of a pry bar for removal of the wheel cover.

Retention band 10 also has an axially inwardly extending flange portion 30 disposed adjacent its axially inner edge and may also be provided with optional radially outwardly extending annular bead 32 formed at the axially inner terminal end thereof. Axially inwardly extending flange portion 30 also has a plurality of aperture groups provided therein at substantially equally spaced apart locations along the circumference thereof, each group consisting of two substantially identical slightly circumferentially spaced apart apertures 34 and 36. Preferably retention band 10 will be provided with four of these aperture groups spaced approximately an equal distance apart along the circumference of flange portion 30, however, should it be desirable, a greater or lesser number may be provided. Apertures 34 and 36 are generally rectangular in shape, of a considerable size, and have rounded corner portions 37 so as to eliminate stress concentrations at these locations which could result in the propagation of tears or cracks in the retention band.

A primary retention member 38 is secured to the radially outer surface of retention band 10 by a single fastener 40, such as a rivet for example, extending through a mid-portion of member 38 and flange portion 30 at a point approximately midway between apertures 34 and 36. An identical primary retention member is secured in like manner between each of the aperture groups around the circumference of flange portion 30.

As best seen in FIGS. 2 and 3, primary retention member 38 has two arm portions 42 and 44 extending tangentially outward in opposite directions from rivet 40. Arm portion 42 has a generally U-shaped portion 46 which extends generally radially inwardly through aperture 34 and then generally radially outwardly therefrom. The radially outwardly extending terminal end portion of arm 42 extends outward beyond the plane in which arms 42 and 44 lie and is provided with a pointed toothed portion 48 adapted to bitingly engage an axially extending radially inwardly facing flange portion 50 of the vehicle wheel as best seen in FIG. 1. As shown in FIG. 3, arm portion 42 has a width only slightly less than that of aperture 34 along its length including the portion passing radially inward through aperture 34 so as to provide a relatively close fit between edges 52 and 54 of arm 42 and the axially inner and outer edges 55 and 56 aperture 34. This close fit serves to prevent arm 42 from being twisted by the forces exerted on tooth member 48 as the wheel trim is installed upon the vehicle wheel as well as limiting pivotal movement of arm 42 around rivet 40. U-shaped portion 46 is formed with another portion or reduced width section 57 beginning at a point near the radially inner extreme part of U-shaped portion 46 and continuing outward to toothed or terminal end portion 48 so as to insure adequate clearance for free radial movement of section 57 with respect to aperture 34 as the retention band is installed upon the vehicle wheel. As arms 42 and 44 are symetrical about rivet 40, a detailed description of arm 44 is believed to be unnecessary. Like portions of arm 44 have been indicated by like numerals primed.

Toothed portion 48 is illustrated in detail in FIG. 4 and is defined by a generally arcuate edge 58 facing axially and radially outwardly and a beveled radially and axially inwardly extending edge 60 which intersect to form a sharp pointed radially outwardly facing tooth 62 which will bite into flange portion 50 of the vehicle wheel.

As is apparent from FIGS. 1 through 3, when retention band 10 and the associated trim member 16 are installed upon vehicle wheel 28, edge portion 60 of respective toothed portions 48 and 48' will engage shoulder portion 26 of wheel 28 and thereby be moved generally radially inwardly causing portions 57 and 57' to move radially inwardly through respective apertures 34 and 36. This movement will also cause arm 42 to move radially inward into engagement with flange portion 30. Likewise, the engagement of toothed portion 48' with shoulder portion 26 of wheel 28 will cause arm 44 to move radially inward into engagement with flange portion 30. As previously mentioned, the close fit between edges 52, 54, 52' and 54' of primary retention member 38 and the axially inner and outer edges 55, 56, 55' and 56' of respective apertures 34 and 36 will effectively limit the twisting force caused by engagement of edge 60 with shoulder 26 as well as preventing rotation of arms 42 and 44 about fastener 40 thus enabling use of a single fastener to secure primary retention member 38 to flange portion 30. Further, as primary retention member 38 is disposed on the radially outer surface of flange portion 30, the retention forces are not transmitted through fastener 40 but rather are transmitted directly from retention member 38 to flange portion 30 through arms 42 and 44. As arms 42 and 44 engage a substantially greater surface area of flange portion 30 than does fastener 40, these forces will be dispersed over a greater surface area thus enabling retention band 10 to be fabricated from substantially thinner gauge material.

While the above disclosed primary retention means provides an extremely reliable means by which a wheel trim may be removably secured to a vehicle, it may be desirable to also provide a secondary retention means. As previously mentioned, primary retention members 38 will be spaced apart a substantial distance along the circumference of flange portion 30. Thus, the retention forces transmitted to flange portion 30 will cause retention band 10 to be distorted slightly radially inwardly at these spaced apart locations and radially outwardly at remote locations between primary retention members 38 such as indicated at 64 of FIG. 5. This localized radially outward bulging of retention band 10 will cause portions of optional annular bead 32 which may be integrally formed on retention band 10 adjacent to and axially inboard of or remotely located with respect to flange portion 30 to engage a safety groove 66 provided on wheel 28 as is shown in FIG. 6 so as to provide a remotely located secondary mechanical interlock therebetween actuated by the primary retention means to further assist in retention of trim member 16. Once wheel trim 16 and retention band 10 are installed upon vehicle wheel 28, bead 32 and safety groove 66 will be in mutual engagement at remotely located spaced apart locations between the points of engagement of primary retention members 38 and flange portion 50. Should this wheel trim assembly encounter an axially outward force attempting to dislodge the wheel trim assembly from the wheel in excess of that which the primary retention members are able to resist, bead 32 will be forced to move slightly axially outward from safety groove 66 toward flange portion 50. This movement will necessarily cause bead 32 to exert a radially inwardly deforming force on retention band 10 thereby causing a greater radially outward force to be transmitted from retention band 10 to primary retention members 38. This transmitted force will increase the biting force which primary retention members 38 are able to exert upon flange portion 50 of wheel 28 thereby enabling them to overcome the effect of the dislodging force and prevent the wheel trim from being lost.

It should be noted that while retention band 10 as illustrated herein is shown as embodying both primary retention means 38 and an annular bead 32 forming a secondary retention means that either of these features may be employed independently of the other as is illustrated in FIG. 11 and 12.

Typically, retention band 10 will be fabricated from strips of sheet metal which are rolled into a circular configuration with a desired axial contour after which the opposite ends are joined to form a ring. In forming this retention band provisions must also be made to accommodate a valve stem. Provisions for this valve stem may be easily incorporated into retention band 10 as shown in FIG. 7 wherein one end of retention band 10 is cut so as to have an extended tab portion 68 which will overlap and be joined to end portion 70 thereof in any desired manner such as by spot welding. A relatively wide notch 72 thereby created at the axially inner edge of retention band 10 will accommodate the tire valve stem. A substantially smaller notch 74 may also be provided at the axially outer edge to facilitate positioning of the wheel trim with respect to retention band 10 during assembly as wheel trim 16 will also have a valve stem aperture which must be aligned with notch 72. Further, when wheel trim member 16 is securely crimped to retention band 10 notch 72 will function to prevent relative rotation of trim member 16 and retention band 10.

Referring now to FIGS. 8 through 10 there is shown an alternative primary retention member 76 secured to retention band 77 which is substantially identical to primary retention member 38 but has a bicuspid tooth portion 78 provided thereon in place of tooth member 48. Toothed portion 78 has a first radially outwardly projecting biting tooth 80 formed by the intersection of arcuate edge 82 and an axially and radially inwardly extending edge 84. Edge 84 also curves radially outward and intersects edge 86 at a radially outwardly disposed location so as to form a second biting tooth 88 which projects radially outwardly a slightly greater distance then does tooth 80. Similarly to retention member 38, retention member 76 also has a reduced width portion 90 adjacent tooth portion 78. However, in this embodiment, tooth portion 78 is slightly wider than another portion 90 having edges 92 and 94 extending axially outwardly and inwardly respectively at the junction of portions 78 and 90. Also, as best seen in FIGS. 9 and 10, tooth 80 is circumferentially offset slightly from tooth 88.

When retention band 77 is installed on a vehicle wheel 98 tooth portion 78 will be deflected radially inwardly and as seen in FIG. 10, and may be deformed slightly circumferentially as well due to the limited range of movement allowed arm portion 96. In this embodiment, teeth 80 and 88 will both be caused to engage wheel 98 at slightly circumferentially spaced apart locations limiting this circumferential displacement. Further, the offset between teeth 80 and 88 will also assist in preventing relative rotation between wheel 98 and retention band 77.

Another embodiment of the present invention is illustrated in FIG. 11 being indicated generally at 100. Wheel trim retention means 100 comprises a retention band 102 substantially identical to that of retention band 10 of FIG. 1, but omitting the annular bead 32 thereof. Further, in this embodiment, retention band 102 is fabricated integrally with a wheel trim member 104 by forming a radially outer circumferential edge portion into the contour of the retention band thereby eliminating the need for a separate manufacturing step to assemble the retention band to the wheel trim. It should be noted, however, that trim member 104 and retention band 102 may be separately fabricated if desired. The wheel trim, of course, may be in the form of either a wheel cover or a trim ring. In either event, a plurality of primary retention members 106 will be secured to the radially outer surface of an axially extending flange portion 108 in an identical manner and will function in an identical manner to that described with reference to retention band 10 and associated primary retention members 38. Therefore, further description thereof is believed unnecessarily redundant.

Referring now to FIG. 12, another embodiment of a retention band in accordance with the present invention is shown generally at 110. Retention band 110 is similar to retention band 10 described above having an irregular generally axially and radially inwardly extending contour including a radially outward extending flange portion 112; a shoulder portion 114; and an axially inwardly extending flange portion 116, all substantially identical to respective portions 12, 24 and 30 of retention band 10. Flange portion 116 also has a plurality of primary retention means 118 secured at circumferentially spaced apart locations around the perimeter thereof which may be in the form of retention members 38 or any other suitable retention means. However, retention band 110 has a plurality of discrete remotely located radially outwardly extending protrusions 120 formed at the axially inner edge of flange portion 116 remote from or intermediate primary retention means 118 in place of annular bead 32 of retention band 10. Protrusions 120 are adapted to engage a safety groove of a wheel in response to the radially inward localized deformation of retention band 110 caused by engagement by primary retention means 118 with the vehicle wheel in an identical manner to that described with reference to annular bead 32. Thus, protrusions 120 affords an alternative arrangement for providing a secondary mechanically interlocking retention means.

It is, therefore, apparent that the present invention provides a secure and reliable means for retaining a trim member on a vehicle wheel which is inexpensive to manufacture and allows a wide flexibility in the design of the trim member. Further, as the primary retention members are secured to the radially outer surface of the retention band, material cost savings may be realized through the use of a smaller gauge material for fabricating the retention band without loss or reduction in the durability thereof. Also the uniquely designed optional secondary retention means which is activated by the primary retention members serves not only to assist in retaining the trim member by forming a mechanical interlock with the safety groove of the wheel, but also increases the biting force exerted by the toothed members.

While the preferred embodiments of the invention disclosed herein afford an extremely reliable and durable wheel trim retention system which may be economically manufactured and assembled, it will be appreciated that the invention is susceptible to modification, variation and change without departing from the proper scope or fair meaning of the subjoined claims.

We claim:

1. A means for retaining a trim member in position on a generally flanged vehicle wheel comprising:
    a retention band;
    retention means integrally formed on said retention band; and a plurality of retention members secured to said retention band, each of said retention members including a pair of oppositely extending arms each having end portions adapted to engage and exert a retention force upon a portion of said wheel so as to distort said retention band from a generally circular shape thereby causing said retention means to engage another circumferentially spaced portion of said wheel to retain said trim member in position thereon.

2. A means for retaining a trim member as set forth in claim 1 wherein said retention band has an axially extending flange portion and said retention means is integrally formed adjacent an axially inner edge of said flange portion.

3. A means for retaining a trim member as set forth in claim 2 wherein said retention means comprise a plurality of discrete radially outwardly extending protrusions.

4. A means for retaining a trim member as set forth in claim 2 wherein said retention means comprises an annular radially outwardly protruding bead.

5. A means for retaining a trim member as set forth in claim 4 wherein said wheel has an annular safety groove and said annular bead is adapted to engage said groove.

6. A means for retaining a trim member as set forth in claim 1 wherein said retention band has a plurality of apertures provided therein, each of said apertures being adapted to cooperate with one of said end portions to allow radial movement of said end portion.

7. A means for retaining a trim member as set forth in claim 6 wherein each of said apertures is further adapted to cooperate with said arm to prevent twisting of said arm.

8. A means for retaining a trim member as set forth in claim 2 wherein said apertures are generally rectangular in shape, said arms are elongated strips and have a portion passing through said aperture, said portion being of a width slightly less than the width of said aperture thereby enabling said aperture and said portion to cooperate to prevent twisting of said arm.

9. A means for retaining a trim member in position on a vehicle wheel comprising:
    a vehicle wheel having a generally axially extending annular flange portion adjacent the axially outer edge thereof and an annular safety groove disposed immediately adjacent and axially inwardly of said annular flange portion;
    a trim member installed on said vehicle wheel, said trim member comprising;
    a retention band;
    a plurality of primary retention members secured to a radially outer surface of said retention band and having portions bitingly engaging said annular flange portion of said wheel at circumferentially spaced locations thereof; and
    secondary retention means integrally formed on said retention band, said secondary retention means engaging said safety groove of said wheel in response to distortion of said retention band caused by said engagement of said primary retention members and said annular flange portion of said wheel at circumferentially spaced locations thereof, said safety groove engagement locations being circumferentially disposed between said annular flange engagement locations.

10. A means for retaining a trim member in position on a generally flanged vehicle wheel comprising:
    a retention band;
    a plurality of primary retention members secured to an outer surface of said retention band so as to bitingly engage a portion of said wheel, each of said primary retention members comprising an elongated strip having a pair of oppositely extending arms each arm having an end portion adapted to bitingly engage said wheel; and
    secondary retention means integrally formed on said retention band, said secondary retention means being caused to engage another circumferentially spaced portion of said wheel in response to distortion of said retention band caused by said engagement of said primary retention means and said wheel.

11. A means for retaining a trim member as set forth in claim 10 wherein said primary retention means are secured to an axially extending annular flange portion of said retention band.

12. A means for retaining a trim member as set forth in claim 10 wherein said retention band is provided with a plurality of spaced apart apertures, said apertures being positioned so as to allow respective portions of said arms to extend generally radially inward through respective ones of said apertures.

13. A means for retaining a trim member as set forth in claim 12 wherein each of said end portions is generally U-shaped and projects generally radially outward through said respective apertures.

14. A means for retaining a trim member as set forth in claim 13 wherein said arm is of a width slightly less than the width of said aperture so as to cooperate with said aperture to prevent twisting of said arm.

15. A means for retaining a trim member as set forth in claim 14 wherein said end portion of said arm has a width less than said arm thereby enabling said end portion to move freely through said aperture.

16. A means for retaining a trim member as set forth in claim 10 wherein each of said end portions is provided with at least one tooth adapted to bitingly engage said wheel.

17. A means for retaining a trim member as set forth in claim 10 wherein each of said end portions is provided with a pair of teeth, one of said teeth being circumferentially offset with respect to another of said teeth.

18. A means for retaining a trim member in position on a generally flanged vehicle wheel comprising:
a retention band having an axially extending flange portion;
a plurality of spaced apart apertures provided in said flange portion;
a plurality of retention means each having a pair of oppositely extending arm members; and
means securing said retention means to the radially outer surface of said flange portion.
each of said arm members having an end portion adapted to be engageable with a portion of said wheel during installation and retention thereon, said apertures being positioned so as to allow said end portions to move within said apertures and each of said arms having a U-shaped portion disposed inwardly along each of said arms from said end portion thereof, said U-shaped portion extending radially inwardly through one of said apertures when in both a relaxed and in an engaged position and being of a width only slightly less than the width of said aperture so as to provide a close fit between the lateral edges of said U-shaped portion and the adjacent edges of said aperture and cooperating therewith to thereby limit twisting of each of said arms to maintain said retention means in substantial circumferential alignment with said retention band.

19. A means for retaining a trim member as set forth in claim 18 wherein each of said retention means is secured to said retention band by a single fastener.

20. A means for retaining a trim member as set forth in claim 18 wherein said apertures are generally rectangular in shape.

21. A means for retaining a trim member as set forth in claim 20 wherein said apertures are further adapted to cooperate with said arms to prevent rotation of said retention means with respect to said retention band.

22. A means for retaining a trim member as set forth in claim 21 wherein another portion of said end portion extends radially outward through said aperture and is of a width substantially less than the width of said aperture so as to be easily movable with respect to said aperture.

23. A means for retaining a trim member as set forth in claim 22 wherein said another portion has a tooth provided thereon adapted to bitingly engage said wheel.

24. A means for retaining a trim member as set forth in claim 22 wherein said another portion has bicuspid teeth provided thereon.

25. A means for retaining a trim member as set forth in claim 24 wherein one of said bicuspid teeth is circumferentially offset with respect to another of said bicuspid teeth.

26. A means for retaining a trim member as set forth in claim 22 wherein said retention band is an integrally formed portion of said trim member.

27. A means for retaining a trim member as set forth in claim 26 wherein said trim member is a trim ring.

28. A means for retaining a trim member as set forth in claim 26 wherein said trim member is a wheel cover.

29. A means for retaining a trim member as set forth in claim 18 wherein a portion of each of said arms engages said flanged portion and is adapted to cooperate therewith so as to increase said retaining forces exerted on said wheel.

30. A means for retaining a wheel trim as set forth in claim 18 wherein each of said arm members includes an outer portion passing through said aperture of a width substantially less than the width of said aperture so as to allow free radial movement of said end portion.

31. A means for retaining a wheel trim in position on a generally flanged vehicle wheel comprising:
a retention band having an axially extending flange portion;
a plurality of spaced apart apertures provided in said flange portion;
a plurality of primary retention means each having a pair of oppositely extending arm members;
means securing said retention means to the radially outer surface of said flange portion;
each of said arm members having an end portion adapted to engage a portion of said wheel and exert a retaining force thereon, said apertures being positioned so as to allow said end portions to move freely within said aperture; and
secondary retention means integrally formed on said retention band, said secondary retention means being adapted to engage another portion of said wheel in response to said engagement of said primary retention means with said wheel.

32. A means for retaining a trim member as set forth in claim 31 wherein said plurality of apertures are arranged in pairs of slightly spaced apart apertures.

33. A means for retaining a trim member as set forth in claim 32 wherein said flange portion has four of said pairs spaced equally around the circumference thereof.

34. A means for retaining a trim member as set forth in claim 33 wherein a primary retention means is secured between each of said pairs of slightly spaced apart apertures, said arm members extending radially inward through respective ones of said pair of apertures.

35. A means for retaining a trim member as set forth in claim 34 wherein said end portions extend radially outward through said aperture.

36. A means for retaining a trim member as set forth in claim 35 wherein said secondary retention means comprise an annular bead formed on said retention band.

37. A means for retaining a trim member as set forth in claim 36 wherein portions of said annular bead are adapted to engage a safety groove on said wheel, said portions being located between said groups of apertures.

38. A means for retaining a trim member as set forth in claim 37 wherein said portions of said annular bead are caused to move radially outward in response to a radially inward deformation of said retention band adjacent said primary retention means.

39. A means for retaining a trim member as set forth in claim 31 wherein said secondary retention means comprise a plurality of discrete radially outwardly extending protrusions, said protrusions being disposed between said plurality of primary retention means.

40. A means for retaining a trim member as set forth in claim 39 wherein said protrusions are adapted to engage a safety groove on said wheel, said protrusions being located between said groups of apertures.

41. A means for retaining a trim member as set forth in claim 40 wherein said protrusions are caused to move radially outward in response to a radially inward deformation of said retention band adjacent said primary retention means.

42. A means for retaining a trim member as set forth in claim 31 wherein said retention band is formed from a strip of sheet material having opposite ends secured together in an overlapping relationship.

43. A means for retaining a trim member as set forth in claim 42 wherein said opposite ends are adapted to form a notch for accommodating a valve stem provided on said wheel.

* * * * *

UNITED STATES PATENT AND TRADEMARK OFFICE
CERTIFICATE OF CORRECTION

PATENT NO. : 4,131,322
DATED : December 26, 1978
INVENTOR(S) : Hans R. Beisch and Heinrich J. Hempelmann It is certified that error appears in the above-identified patent and that said Letters Patent are hereby corrected as shown below:

Col. 8, line 8 (Claim 8) "2" should be --7--.

Signed and Sealed this

Fifth Day of June 1979

[SEAL]

Attest:

RUTH C. MASON
Attesting Officer

DONALD W. BANNER
Commissioner of Patents and Trademarks